US012809020B2

(12) United States Patent
Doiron

(10) Patent No.: US 12,809,020 B2
(45) Date of Patent: Nov. 24, 2026

(54) METHODS AND SYSTEMS FOR ESTIMATING TRAILER-INDUCED OCCLUDED REGIONS

(71) Applicant: Magna Electronics, LLC, Southfield, MI (US)

(72) Inventor: Tyler Gayle Doiron, Pinckney, MI (US)

(73) Assignee: Magna Electronics, LLC, Southfield, MI (US)

( * ) Notice: Subject to any disclaimer, the term of this patent is extended or adjusted under 35 U.S.C. 154(b) by 212 days.

(21) Appl. No.: 18/915,316

(22) Filed: Oct. 14, 2024

(65) Prior Publication Data

US 2026/0104506 A1 Apr. 16, 2026

(51) Int. Cl.
*G01S 13/931* (2020.01)
*G01S 13/42* (2006.01)

(52) U.S. Cl.
CPC ............ *G01S 13/931* (2013.01); *G01S 13/42* (2013.01); *G01S 2013/9315* (2020.01); *G01S 2013/93272* (2020.01)

(58) Field of Classification Search
CPC .................... G01S 13/931; G01S 13/42; G01S 2013/9315; G01S 2013/93272; G01S 7/40; G01S 2013/93275; G01S 7/415; G01S 2013/932
See application file for complete search history.

(56) References Cited

U.S. PATENT DOCUMENTS

| | | | | |
|---|---|---|---|---|
| 9,594,155 | B2 | 3/2017 | Cashler et al. | |
| 10,286,916 | B2 | 5/2019 | Prasad et al. | |
| 11,967,237 | B2 | 4/2024 | Robinson et al. | |
| 2016/0041258 | A1 | 2/2016 | Cashler | |
| 2016/0274228 | A1* | 9/2016 | Cashler | G01S 13/872 |
| 2022/0284816 | A1 | 9/2022 | Ho et al. | |
| 2022/0319101 | A1* | 10/2022 | Wang | G01C 21/3635 |

OTHER PUBLICATIONS

Jan. 29, 2026 PCTUS2025050946—International Search Report (3 pgs).
Jan. 29, 2026 PCTUS2025050946—Written Opinion (21 pgs).

* cited by examiner

*Primary Examiner* — Timothy A Brainard
*Assistant Examiner* — Bongani Jabulani Mashele
(74) *Attorney, Agent, or Firm* — Matthew D. Thayne; Thayne and Davis LLC

(57) ABSTRACT

Methods and systems for estimating, calculating, and/or updating trailer-induced occluded regions within a host vehicle. In some implementations, the method may comprise detecting an external target using a rear vehicle RADAR system at a first time; determining an angle between the external target and a reference line extending behind the vehicle; and comparing the angle with a maximum occlusion angle between the vehicle and the trailer. Upon determining that the angle is less than the maximum occlusion angle, the external target may be categorized as a reflection target. This categorization may result in data from the external target being used to estimate, calculate, and/or update a trailer-induced occluded region.

20 Claims, 5 Drawing Sheets

METHODS AND SYSTEMS FOR ESTIMATING TRAILER-INDUCED OCCLUDED REGIONS

SUMMARY

Methods and systems for estimating, defining, calculating, refining, and/or updating a trailer-induced occluded region associated with a trailer being towed by a host vehicle.

Systems using RADAR to detect a trailer and provide useful information to a driver associated with the trailer are known. For example, some systems include a Trailer Clutter Detection (TCD) system to minimize adverse effects of trailer-induced clutter on a blind spot detection system. However, trailer clutter mitigation faces many challenges, such as reliably detecting multi-path reflection targets caused by the trailer face acting as a mirror. Reflection targets often mimic the behavior of rear entry or TOS (Target Overtaking Subject) targets, which results in an ability to reliably distinguish between valid targets and reflection or "ghost" targets in order to enhance performance begin needed. Indeed, false warnings are both a nuisance to the driver and may result in more severe problems, including accidents. Degradation of performance caused by failure to reliably distinguish such targets also degrades driver trust in RADAR systems.

The present inventor has therefore determined that it would be desirable to provide systems and methods that overcome one or more of the foregoing limitations and/or other limitations of the prior art. Systems and methods for improving the ability to define a trailer-induced occluded region are therefore disclosed herein, which may improve the ability to accurately assess and distinguish between valid targets and reflection targets and ultimately improve performance.

In a more particular example of a method for estimating a trailer-induced occluded region behind a vehicle towing a trailer according to some implementations, the method may comprise defining a maximum occlusion angle between the vehicle and the trailer. An external target may then be detected using a sensor, such as RADAR signals. One or more angles may then be determined and/or perceived using the sensor and/or signals. For example, a first perceived angle associated with the external target may be determined at a first time. A second perceived angle associated with the external target may then be determined at a second time. A determination may then be made as to whether the first perceived angle and/or the second perceived angle is within the maximum occlusion angle.

Upon determining that one or more of the perceived angles are within the maximum occlusion angle, data obtained from observing the external target may be used or stored for future use to estimate one or more aspects of a trailer-induced occluded region of the trailer. For example, in some implementations, upon determining that both the first perceived angle and the second perceived angle are within the maximum occlusion angle, data from the external target may be used to estimate a trailer-induced occluded region of the trailer.

In some implementations, upon determining that either the first perceived angle or the second perceived angle is greater than the maximum occlusion angle, the external target may be categorized as a valid target. In some cases, this categorization may result in discarding data from the valid target, or from all targets categorized as valid, from an estimate of the trailer-induced occluded region of the trailer.

Some implementations may further comprise determining whether one or more data points suggest that the external target is tracking the host vehicle and/or whether one or more data points associated with the external target appear to be mimicking or matching that of the host vehicle. For example, in some implementations, a determination may be made as to whether the external target track position is monotonically decreasing relative to the host vehicle.

Upon determining that the one or more data points suggest that the external target is tracking the host vehicle and/or that one or more data points associated with the external target appear to be mimicking or matching that of the host vehicle, a determination may be made that the external target is a reflection target, which may result in storage and/or usage of data from the external target for purposes of defining, refining, calculating, and/or estimating the trailer-induced occluded region. For example, in some implementations, if a determination is made that the external target track position is not monotonically decreasing relative to the vehicle, a determination may be made that the external target is a reflection target, which may result in storage and/or usage of data from the external target for purposes of defining, refining, calculating, and/or estimating the trailer-induced occluded region.

In some implementations, this determination may be made along with one or more other determinations before a categorization and/or data usage decision is made. For example, in some implementations, along with determining that the external target track position is not monotonically decreasing relative to the vehicle, and upon determining that both the first perceived angle and the second perceived angle are within the maximum occlusion angle, the external target may be categorized as a reflection target and/or data from the external target may be stored and/or used to estimate the trailer-induced occluded region of the trailer.

Some implementations may further comprise defining a tolerance angle for the maximum occlusion angle. In some such implementations, the step of determining whether the first perceived angle is within the maximum occlusion angle may comprise determining whether the first perceived angle is within the maximum occlusion angle plus the tolerance angle, and the step of determining whether the second perceived angle is within the maximum occlusion angle may comprise determining whether the second perceived angle is within the maximum occlusion angle plus the tolerance angle.

In some implementations, a predetermined number of observations of the external target may be required before categorizing the external target and/or using its data for estimating the trailer-induced occluded region of the trailer. Thus, in some implementations, the step of using data from the external target to estimate a trailer-induced occluded region of the trailer is not performed until a predetermined number of observations of the external target are received and/or processed.

In some implementations, one or more aspects of the system may be reset upon determining that the current trailer has been decoupled and/or a new trailer has been coupled with the vehicle. In some implementations, for example, the estimate of the trailer-induced occluded region of the trailer may be reset upon a determination being made of a potential coupling of a new trailer with the vehicle. In some implementations, a determination of the potential coupling of a new trailer with the vehicle and/or an estimate of the trailer-induced occluded region being reset may be made upon detecting that the vehicle has stopped, turned off, and/or reset.

In an example of a method for distinguishing between reflection targets and valid targets in rear RADAR system for a vehicle towing a trailer according to some implementations, the method may comprise detecting an external target using a rear vehicle RADAR system at a first time; determining an angle between the external target and a reference line extending behind the vehicle; and comparing the angle with a maximum occlusion angle between the vehicle and the trailer. Upon determining that the angle is less than the maximum occlusion angle, the external target may be categorized as a reflection target.

In some implementations, upon determining that the angle is greater than the maximum occlusion angle, the external target may be categorized as a valid target.

Data from any external targets categorized as a reflection target may be stored and/or used to define an estimated trailer-induced occluded region for the trailer.

Some implementations may further comprise detecting the external target using the rear vehicle RADAR system at a second time; determining a second angle between the external target and the reference line at the second time; and comparing the second angle with the maximum occlusion angle. Upon determining that both the angle and the second angle are within the maximum occlusion angle, the external target may be categorized as a reflection target and/or the corresponding data used to define, refine, calculate, and/or estimate the trailer-induced occluded region.

Some implementations may further comprise detecting a perceived travel direction of the external target at one or more times and using this data to categorize the external target. For example, in some implementations, a perceived travel direction of the external target may be detected at a first time and at a second time. The perceived travel directions of the external target at the first and second times may then be compared with corresponding travel directions of the vehicle at the first and second times. In some such implementations, upon determining that both the angle and the second angle are within the maximum occlusion angle and determining that the perceived travel directions of the external target at the first and second times match the travel directions of the vehicle at the first and second times, the external target may be categorized as a reflection target.

In some implementations, the maximum occlusion angle may be defined by a maximum trailer width supported by the vehicle and a tolerance angle.

In some implementations, the reference line may extend at least substantially parallel to an axis of the vehicle.

In an example of a system for detecting trailer-induced RADAR occlusion, the system may comprise one or more RADAR sensors positioned on a bumper or other rear portion of a host vehicle. The vehicle may further comprise a target bearing module configured to determine detection angles with an external target, such as determine detection angles between a reference line and an external target detected by a RADAR sensor. The target bearing module may further be configured to determine a direction and/or velocity of travel of the external target.

The system may further comprise an occluded region estimation module configured to estimate a trailer-induced occluded region associated with the RADAR sensor using data from the target bearing module.

The system may further comprise a reflection target categorization module configured to categorize external targets as reflection targets. In some embodiments, the reflection target categorization module may be configured to categorize external targets as reflection targets by comparing detection angles between the reference line and the external target over time with a maximum occlusion angle between the vehicle and the trailer. Upon detecting a target detection angle that is greater than the maximum occlusion angle, the target associated with the target detection angle may be categorized as a valid target and/or excluded from categorization as a reflection target. Data associated with the reflection targets may then be compiled and/or processed for use by the occluded region estimation module to estimate the trailer-induced occluded region of the trailer.

In some embodiments, the reflection target categorization module may be further configured to compare perceived travel directions of the external target with corresponding travel directions of the host vehicle. Upon determining that the perceived travel directions match the travel directions of the vehicle at the first and second times, the external target may be categorized as a reflection target, in some cases only so when some of the other conditions described herein are met as well, such as perceived angles being within the maximum occlusion angle.

Some embodiments may further comprise a second RADAR sensor positioned on a rear portion or other rear portion of the host vehicle. In some such embodiments, the target bearing module may further be configured to determine detection angles between a reference line and an external target detected by the second RADAR sensor. In some such embodiments, the occluded region estimation module may be further configured to estimate a second trailer-induced occluded region associated with the second RADAR sensor using data from the target bearing module.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
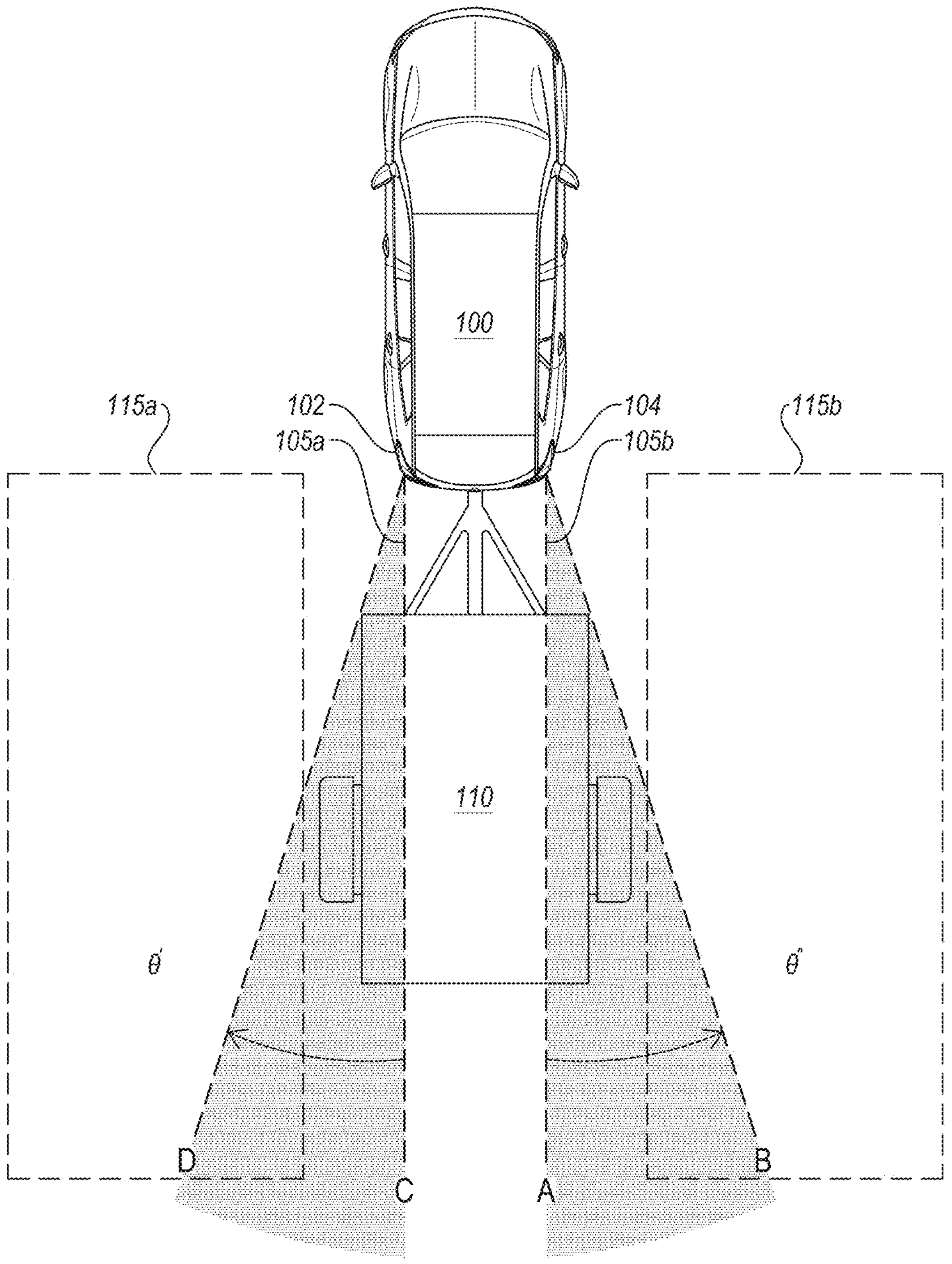
FIG. 1 depicts a vehicle having a system for estimating one or more trailer-induced occluded regions according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term “substantially” refers to the complete or nearly complete extent or degree of an action, characteristic, property, state, structure, item, or result to function as indicated. For example, an object that is “substantially” cylindrical or “substantially” perpendicular would mean that the object/feature is either cylindrical/perpendicular or nearly cylindrical/perpendicular so as to result in the same or nearly the same function. The exact allowable degree of deviation provided by this term may depend on the specific context. The use of “substantially” is equally applicable when used in a negative connotation to refer to the complete or near complete lack of an action, characteristic, property, state, structure, item, or result. For example, structure which is “substantially free of” a bottom would either completely lack a bottom or so nearly completely lack a bottom that the effect would be effectively the same as if it completely lacked a bottom.

Similarly, as used herein, the term “about” is used to provide flexibility to a numerical range endpoint by providing that a given value may be “a little above” or “a little below” the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts a vehicle 100 having a system for estimating one or more trailer-induced occluded regions according to some embodiments. As shown in this figure, vehicle 100 comprises two sensors 102/104, one on or near each rear bumper of vehicle 100, that may be used to detect external objects. In some embodiments and implementations, sensors 102/104 may comprise RADAR sensors. Sensors 102 and 104 may be part of a Trailer Clutter Detection (TCD) algorithm and/or system.

In some systems, blind spot detection may be provided. In systems configured for use with trailers, extended blind spot detection zones may be provided to allow for detection of blind spots adjacent to a trailer, such as trailer 110. Thus, vehicle 100 is configured to provide for two blind spot detection warning zones 115*a* and 115*b*, each of which is adjacent to a respective side of trailer 110.

Each sensor 102/104 has a respective field of view (FOV), each respective FOV of which is partially blocked by the trailer 110. Thus, as shown in FIG. 1, sensor 102 comprises an occluded region defined by angle θ' and sensor 104 comprises an occluded region defined by angle θ". These occluded regions are defined by the portions of the FOVs of each of the sensors 102/104 that are blocked by the trailer 110. Therefore, remote objects with bearings within these occluded regions will have limited or no visibility to the sensors 102/104.

Knowledge of the occluded regions defined by angles θ' and θ" is useful for accurately predicting where reflection targets are expected to be detected or perceived to have been detected relative to valid targets. As used herein, a “reflection target” is an external target detected by a vehicle sensor following a reflection caused by a portion of a trailer acting as a mirror. By contrast, a “valid target” is an external target detected by a vehicle sensor without such a reflection, such as a target detected directly from a reflection from the target itself.

Because reflection targets may be reflected from the trailer 110 and may mimic the behavior of valid targets, reliably distinguishing between reflection targets and valid targets may be useful in avoiding false warnings, degrading trust in blind spot systems, including those with TCD, and/or other RADAR sensor systems, and ultimately avoiding accidents. Moreover, because each trailer is unique in terms of size, shape, and materials, methods for reliably estimating trailer-induced occluded regions unique to a specific trailer after attachment may be useful in order to optimize performance. As such, vehicle 100 may comprise a system for estimating specific trailer-induced occluded regions for a particular trailer 110 that are defined by angles θ' and θ". Such estimation may allow for more reliably using collected data to provide useful information to drivers about potential hazards, particularly hazards relating to trailer 110 being towed by vehicle 100, for each unique trailer configuration.

As shown in FIG. 1, angle θ' is the angle between lines C and D and angle θ" is the angle between lines A and B. In some embodiments and implementations, one or more of these lines may be a reference line, which may be preconfigured to extend in a fixed direction in some cases as opposed to one requiring ongoing updates and/or calculations. For example, in some embodiments, lines A and C, which extend parallel to the axis of the vehicle 100, may be preconfigured as fixed reference lines, as indicated at 105*a* and 105*b*.

The angles θ' and θ" and therefore the lines B and D may be derived in some cases using, at least in part, a preconfigured and/or maximum trailer width, such as a maximum supported trailer width for a particular vehicle. In some cases, angles θ' and θ" and therefore the lines B and D may be derived, at least in part, from a preconfigured and/or assumed shortest distance between the rear bumper of vehicle 100 and the front face and/or a portion of the front surface of the trailer 110. In other cases, this distance may be measured using the sensors 102/104 or other sensors known and/or available to those of ordinary skill in the art. Similarly, in some cases, a trailer width and/or distance between the bumper of the vehicle 100 and the trailer 110 may be input manually or derived from information about the model of the trailer 110.

In some embodiments and implementations, as discussed in greater detail below, this system may use data from each target to determine or estimate whether the target is a reflection target or a valid target. Data from suspected or confirmed reflection targets may then be used to more accurately define or estimate one or more trailer-induced occluded regions dynamically, such as the regions defined by angles θ' and θ" in FIG. 1. This enhanced estimation may then be used to improve performance of a RADAR or other sensor system designed to operate in conjunction with a trailer 110 by more easily and/or readily designating a target as a reflection target that should not be considered a threat to the vehicle 100 and/or trailer 110.

Figure 2A:
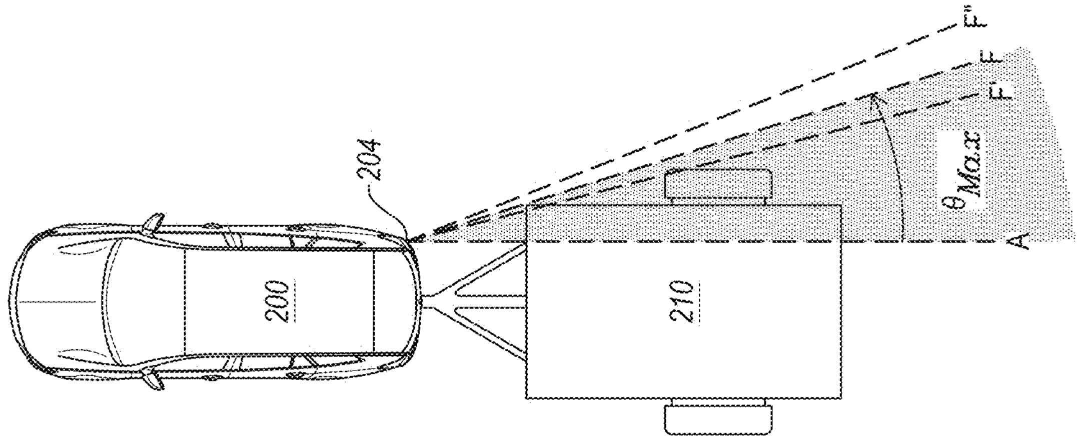
FIGS. 2A-2C depict another vehicle having a system for estimating one or more trailer-induced occluded regions according to other embodiments.
Figure 2B:
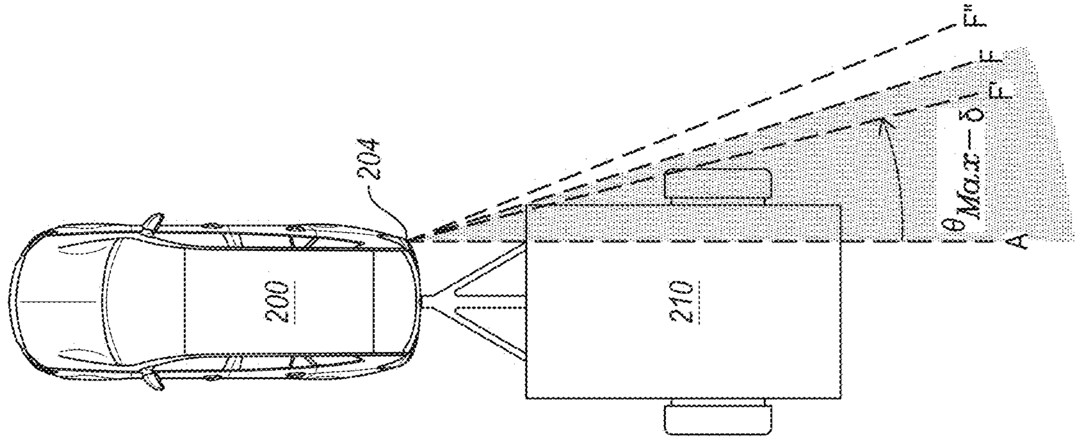
Figure 2C:
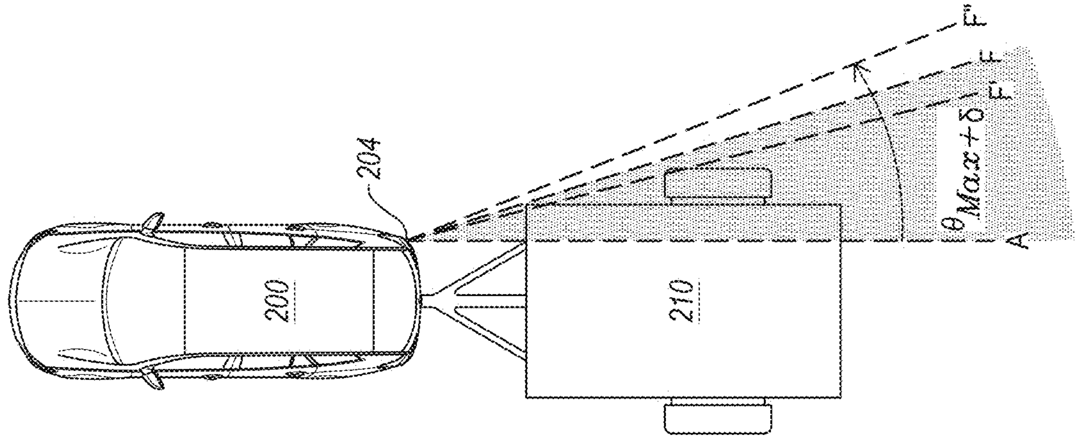

FIGS. 2A-2C depict further details regarding systems for estimating trailer-induced occluded regions according to other embodiments. FIG. 2A depicts a vehicle 200 towing a trailer 210. A sensor 204 is shown positioned on the rear bumper of vehicle 200. Although only a single sensor 204 is shown in FIGS. 2A-2C and accordingly only an occluded region of a respective single side of the trailer 210 is shown in these figures, it should be understood that other sensors may be included as needed, including but not limited to another sensor on the opposite side of the rear bumper of vehicle 200.

FIGS. 2A-2C depict how some embodiments may be configured to incorporate tolerance into a maximum allowed trailer-induced occluded region, max. As shown in FIG. 2A, max is defined to be the angle between lines A and F. This angle may be derived as previously described and in some cases may be updated using information obtained by categorizing targets as valid or reflected targets as described herein.

As shown in FIGS. 2B and 2C, in some embodiments, a configurable parameter □ may be used to provide for a degree of tolerance for max. Indeed, as shown in these figures, this tolerance may be defined in some cases by defining two additional lines, namely, lines F' and F", which are respectively measured by adding or subtracting the tolerance angle □ to max.

Thus, as shown in FIG. 2B, an angle max−□ may be defined between reference line A and line F'. This angle may be used to delineate the minimum possible angle width in which a detected target can be considered to be a reflection target and/or may otherwise be used to provide tolerance in categorizing targets as either reflection targets or valid targets to improve sensor performance.

Similarly, as shown in FIG. 2C, an angle max+□ may be defined between reference line A and line F". This angle may be used to delineate the maximum possible angle width in which a detected target can be considered to be a reflection target and/or may otherwise be used to provide tolerance in categorizing targets as either reflection targets or valid targets to improve sensor performance.

These tolerance angles may be used in a variety of ways, as desired. For example, in some embodiments, if a target is ever identified as having a perceived angle that is greater than angle max+□, or in some cases if a target is ever identified as having a perceived angle that is greater than angle max+□ and one or more other parameters and/or conditions are satisfied, the target may be categorized as a valid target. In some such cases, this data may be discarded, or at least discarded for purposes of use in defining/refining the trailer-induced occlusion angle. In other words, this data may be used in connection with other algorithms/features of the system if desired, but may be indicated as not useful for purposes of defining/refining the maximum occlusion angle.

In some embodiments, if any portion of a target is ever identified as being within, or outside of, a given angle, data associated with the target may be stored and/or used for a particular purpose. For example, in some cases, if any portion of a target is perceived as having a bearing angle that is greater than angle max+□ (again, in some cases along with other conditions), the target may be categorized as valid. In some cases, a threshold may be tied to the minimum angle max−□, either alone or in conjunction with conditions that depend upon max+□.

For example, in some embodiments and implementations, if a target and/or any portion of a target is identified as being within the angle max−□, the target may be categorized as, or conditionally categorized as subject to further data/analysis, a reflection target.

Figure 3B:
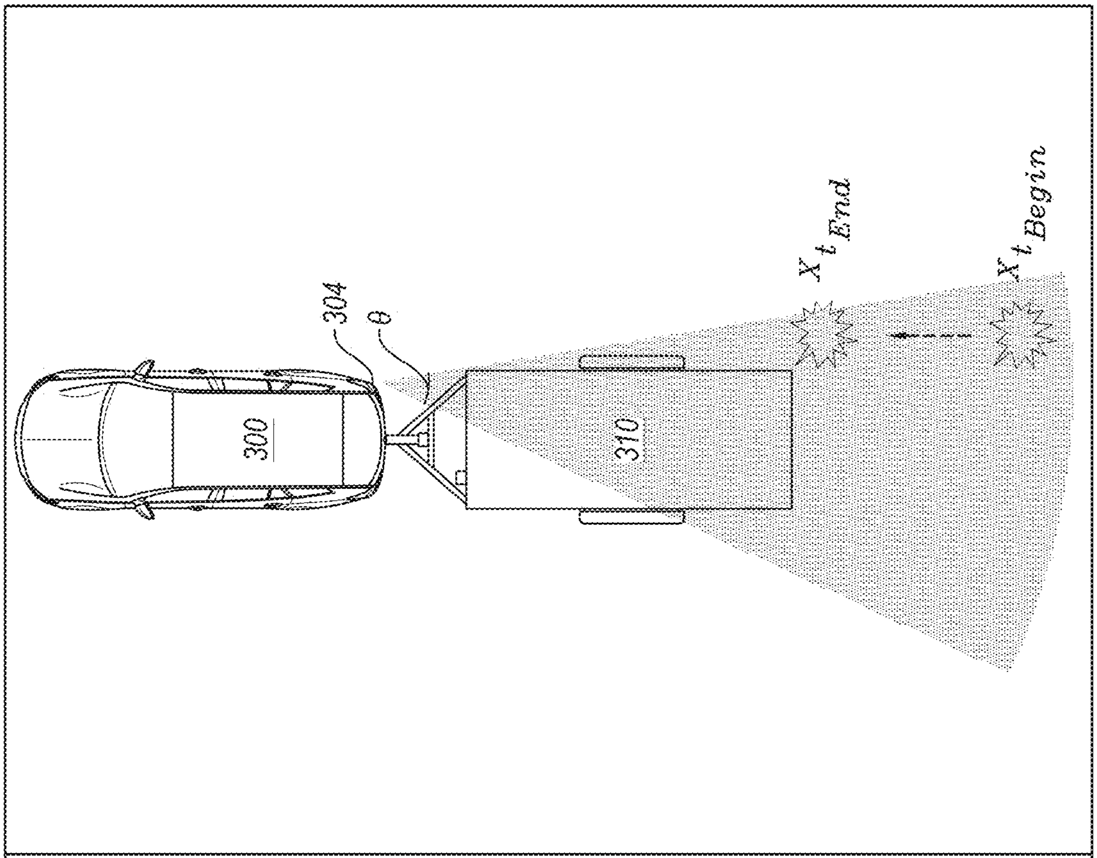
FIG. 3B depicts the vehicle of FIG. 3A during a process for categorizing a target as a reflection target.
Figure 3A:
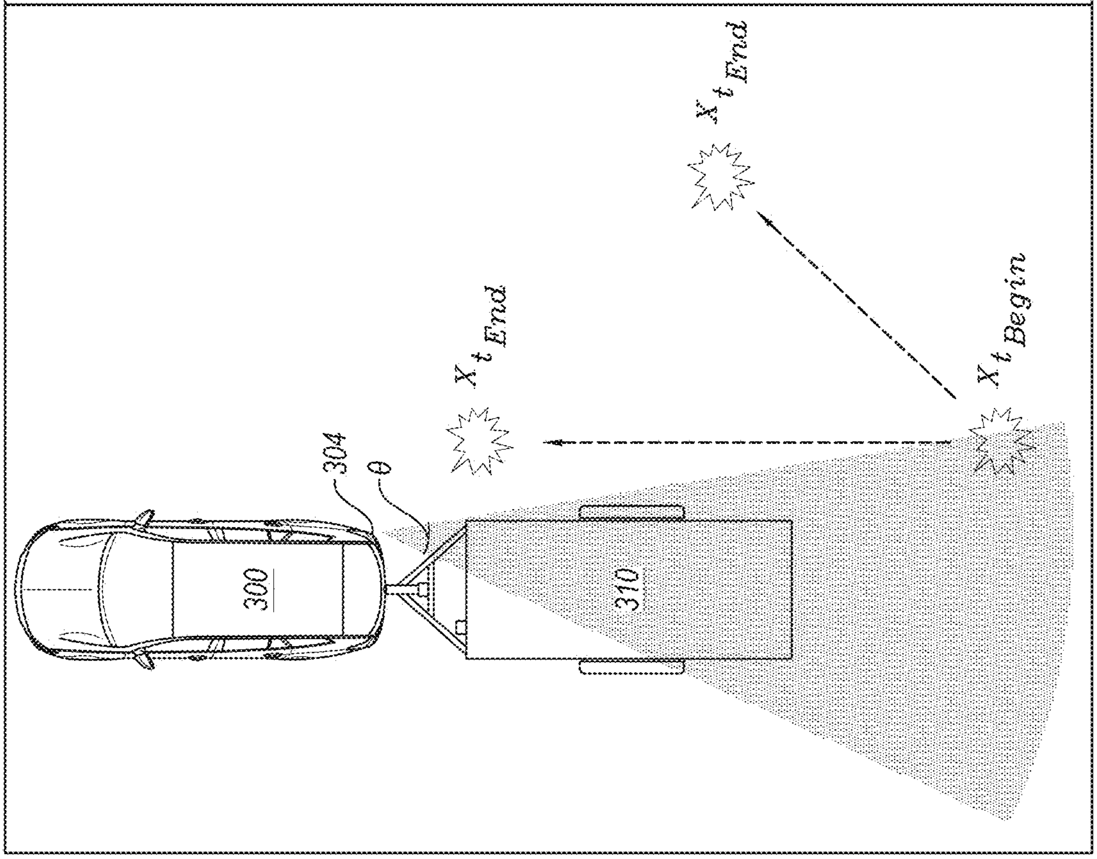
FIG. 3A depicts a vehicle having a system for estimating one or more trailer-induced occluded regions during a process for categorizing a target as a valid target.

FIGS. 3A and 3B provide additional details regarding how data associated with targets may be used over time to define/refine trailer-induced occlusion regions. These figures depict a vehicle 300 comprising a sensor 304, such as a RADAR sensor. Vehicle 300 is towing a trailer 310 and is configured with a system for detecting external targets relative to trailer 310 and/or defining a trailer induced occluded region associated with trailer 310.

FIG. 3A depicts an external target that can be considered a valid target according to the RADAR system of vehicle 300 (or at least a subsystem thereof). Thus, the target shown in the figure may be observed by sensor 304 at a first point in time ($x(t_{begin})$) and then one or more subsequent points in time $x(t_{end})$. Although the target was initially identified as being within the trailer-induced occluded region defined by angle θ, if the target is later identified as being outside of this region, as indicated by both of the $x(t_{end})$ images in FIG. 3A, in some embodiments and implementations, the target may be categorized as a valid target rather than a reflection target. As previously mentioned, this categorization may then result in the data associated with this target being excluded from use in connection with a process and/or algorithm for defining/refining the scope of the trailer-induced occluded region.

As used herein, a "detection" can refer to any one of a series of RADAR returns from a single target, e.g., a vehicle, person, street sign, etc. By contrast, an "observation" can include a group or series of detections of a particular target and can therefore include multiple detections of and/or representative of the target. As those of ordinary skill in the art appreciate, a group of detections associated with the same target over a particular RADAR processing cycle may therefore be considered an "observation" of the target. Similarly, if a series of detections is associated with the same target over multiple RADAR processing cycles, these may be considered separate "observations."

By contrast, FIG. 3B depicts another scenario in which an external target can be considered a reflection target according to the RADAR system of vehicle 300 (or at least a subsystem thereof). In this scenario, the target begins at a similar location ($x(t_{begin})$) within the occluded region. However, the target is subsequently identified as also being within the occluded region at a subsequent time $x(t_{end})$. Because the target is never identified as being outside of the occluded region, it may be useful to categorize the target as a reflection target. Because reflection targets can be considered as being perceived to be within the occluded region, the data associated with such detections may be useful in defining and/or refining the scope of the occluded region, which may be used to improve sensor performance.

In some cases, additional data may be used to categorize targets as reflection targets or valid targets or may otherwise be used to define and/or refine the scope of the occluded region. For example, in some embodiments and implementations, the track position of the target may be compared with the corresponding velocity and/or heading of the host vehicle. If the coordinates (x,y) of the target track consistently matches that of the host vehicle, this may be used as an indication that the target is likely a reflection target. If, for example, the external target track position of a target is monotonically non-decreasing relative to the host vehicle, this may be used as an indication that the target is likely a reflection target.

In other embodiments, other comparisons and/or data may be used to determine whether to categorize an external target as a reflection target and/or use its associated data to estimate the scope, such as angle, of a trailer-induced occlude region. For example, data from the host vehicle may be compared with data from the target as a precondition for such categorization and/or data usage. If, for example, the external target appears to be tracking the direction, velocity, speed, and/or path of the host vehicle, this may be used as an indication or condition for such categorization/usage.

Thus, in some embodiments and implementations, a decision to categorize a particular target as a reflection target (such that the data associated with the target may be used to define and/or refine the trailer-induced occluded region defined by angle θ) may be made using multiple data points. For example, the decision may involve assessing whether the target is perceived as being within the occluded region, as perceived as being within the occluded region at multiple times, or is perceived as being within the occluded region at every time at which the target is detected. In some cases, the target may only be categorized as a reflection target if one or more of the aforementioned conditions are met and if additional conditions are met. For example, in some cases, the decision may require an indication that the target's position and/or velocity match that of the host vehicle, such as requiring that the detection/track position of the target be monotonically non-decreasing.

Figure 4:
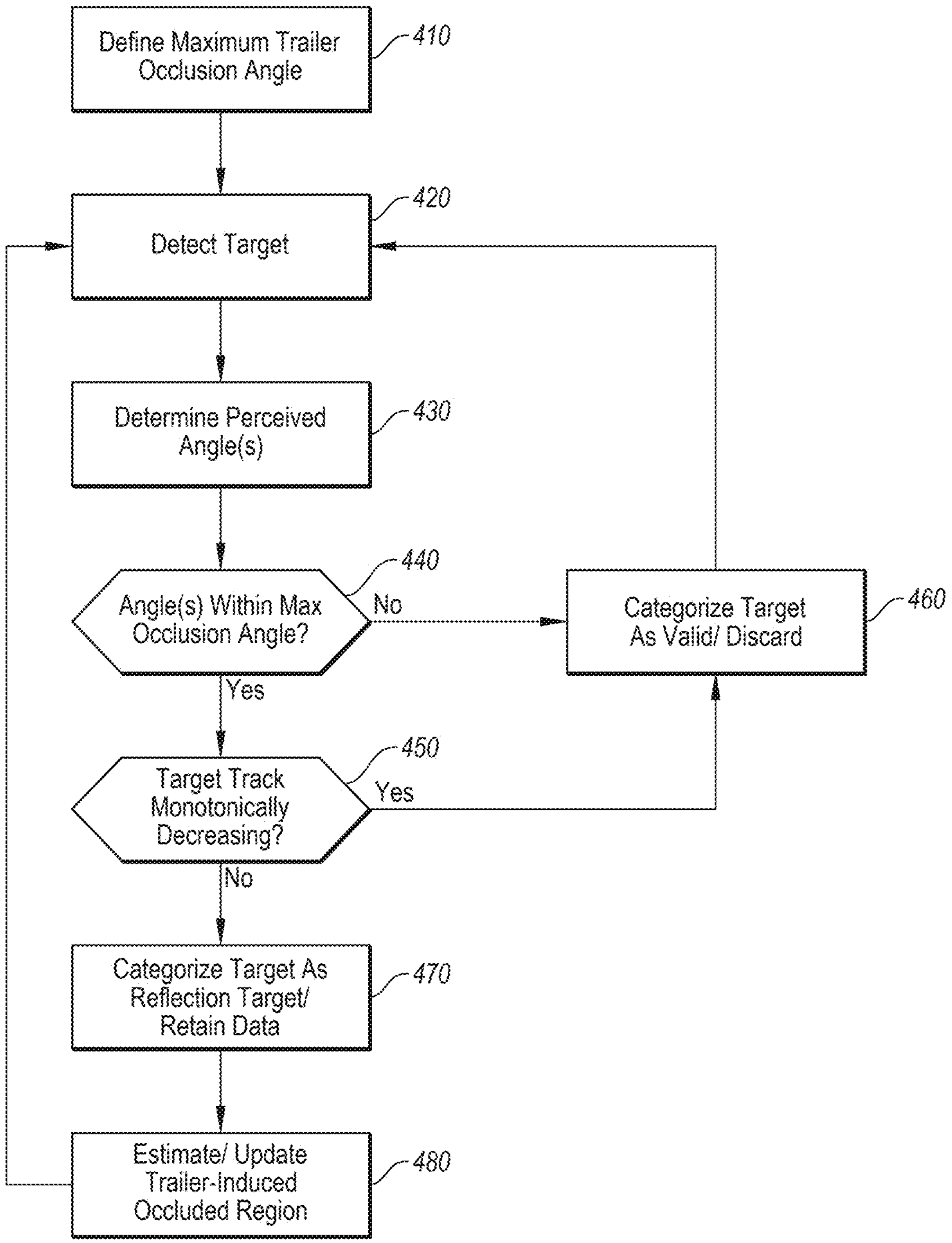
FIG. 4 is a flow chart depicting an example of a method for estimating a trailer-induced occluded region according to some implementations.

FIG. 4 is a flow chart depicting an example of a method for estimating, defining, and/or refining the scope of a trailer-induced included region associated with a trailer being towed by a host vehicle. The method of FIG. 4 begins at 410 at which time a maximum trailer occlusion angle is defined. In some implementations, the maximum trailer occlusion angle may be derived from data associated with the trailer being towed, data from one or more sensors of the vehicle, including but not limited to rear bumper RADAR sensors, and/or data from previous target detections and/or observations.

In some implementations, the maximum occlusion angle may be defined by a maximum trailer width supported by the vehicle. In some such implementations, the maximum occlusion angle may be further defined by a tolerance angle. In some cases, the maximum occlusion angle may be simply predefined by reference to a particular trailer or may be manually input by a user, manufacturer, or dealer as fixed data.

After a maximum trailer occlusion angle has been defined, an external target may be detected at 420. A perceived angle of the target may then be detected and/or determined at 430. In some implementations, the perceived angle may be measured from a reference line, such as a fixed reference line extending parallel to an axis of the vehicle in some implementations.

A determination may then be made as to whether the perceived angle is within the maximum occlusion angle at 440. If the perceived angle is outside of the defined maximum occlusion angle, the target may be categorized as a valid target at 460. In some implementations, the data associated with the target may then be discarded, or at least not used for purposes of refining the scope of the maximum occlusion angle. In some implementations, however, the data associated with valid targets may be used for other purposes. In some cases, the maximum occlusion angle may be fixed/constant. Measurements of occlusion angles using targets may then be made in comparison to this fixed angle, which may be calculated using trailer dimensions, known dimensions of a particular trailer model, and/or input manually by a user manually, such as a dealer or customer.

If the perceived angle is within the defined maximum occlusion angle, the method may proceed to step 450. In some implementations, however, multiple perceived angles being within the maximum occlusion angle may be required before the method can proceed to step 450. In some methods including step 450, a determination may then be made as to whether the target track is monotonically decreasing relative to the host vehicle. In some implementations, this step may be replaced with other steps. For example, other processes may be used to assess whether the target track differs from the host vehicle track, such as assessing the perceived velocity of the target relative to the host vehicle.

If the target track is monotonically decreasing and/or if other indicia of a meaningful difference between the velocity, speed, direction of travel, or the like between the target and the host vehicle are detected, the method may proceed to step 460. As discussed above, this step may result in the target being categorized as a valid target rather than a reflection target. In some cases, this categorization may also result in the data associated with the target being discarded from a data set used to refine the occlusion angle. As previously mentioned, however, in some cases this data may be stored and used for other purposes as desired.

If the target track is monotonically non-decreasing and/or if there is an absence of any, or one or more, indicia of a meaningful difference detected between the velocity, speed, direction of travel, or the like between the target and the host vehicle, the method may proceed to step 470. Step 470 may comprise identifying and/or categorizing the target as a reflection target. Because of the usefulness of such data in defining and/or refining the angle and/or scope of the occluded region caused by the trailer being towed by the host vehicle, in some implementations, this data may be stored and/or used for subsequent calculations and/or analyses in estimating, refining, and/or updating the scope of this occluded region.

For example, in some implementations, step 470 may comprise adding a maximum observed angle of the target to a point buffer. In some implementations, if the buffer is not full, this angle may simply be added to the buffer. If the buffer is full, in some implementations, the maximum observed angle of the target may be added by replacing another data point already in the buffer. For example, in some implementations, in the event that the buffer is full, the maximum observed angle may be added so as to minimize the standard deviation of the buffer by replacing the angle in the buffer that is furthest from the mean of the buffer with the maximum observed angle of the target.

Following step 470, one or more steps may be taken to estimate, update, improve, and/or refine one or more characteristics of the occluded region to improve future performance. For example, in some implementations, step 470 may simply comprise updating a buffer of observed angles associated with the occluded region, such as by adding the maximum observed angle of the target or replacing an angle in the buffer with this angle, as discussed above. However, in other implementations, step 470 may alternatively, or additionally, comprise one or more processing steps, which may involve use of updated buffer data, to obtain one or more angles or other data—such as a maximum angle from a reference angle—which may enhance the current scope and/or definition of the trailer-induced occluded region.

In some implementations, additional steps may be included that may be used to initiate the process or one or more steps therewithin. For example, in some cases, attempts to estimate and/or update one or more trailer-induced occlusion regions may not take place until a trigger condition is met. For example, a calculation/algorithm may restart upon detecting that a vehicle has stopped and/or been turned off or that a trailer has been decoupled and/or coupled with the host vehicle.

In some cases, estimates/updates may only be made upon conditions relating to the current velocity of the host vehicle. For example, it may be required that the host vehicle be moving in a straight or relatively straight direction before estimates/updates are made. In some cases, for example, data may only be collected and/or used for such calculations/updates upon determining that a yaw rate and/or velocity of the vehicle are above minimum threshold values.

Similarly, in some cases, an accumulated distance of the host vehicle may be used to determine whether a calculation and/or update should be made. For example, a minimum threshold accumulated distance may be used to determine whether a point buffer should be updated and/or processed, which may result in an occlusion angle decision being updated.

Some embodiments and implementations may further comprise one or more steps to check angle conditions and/or monotonic requirements against various reflection target signatures. For example, RADAR reflections are known to include reflections of “Type I,” which come from square nose trailers and “Type II,” which come from V-nose trailers. Thus, in some cases, tests may be included to adjust angles and/or calculations according to detected conditions indicating that a reflection is likely a Type I or Type II reflection.

Figure 5:
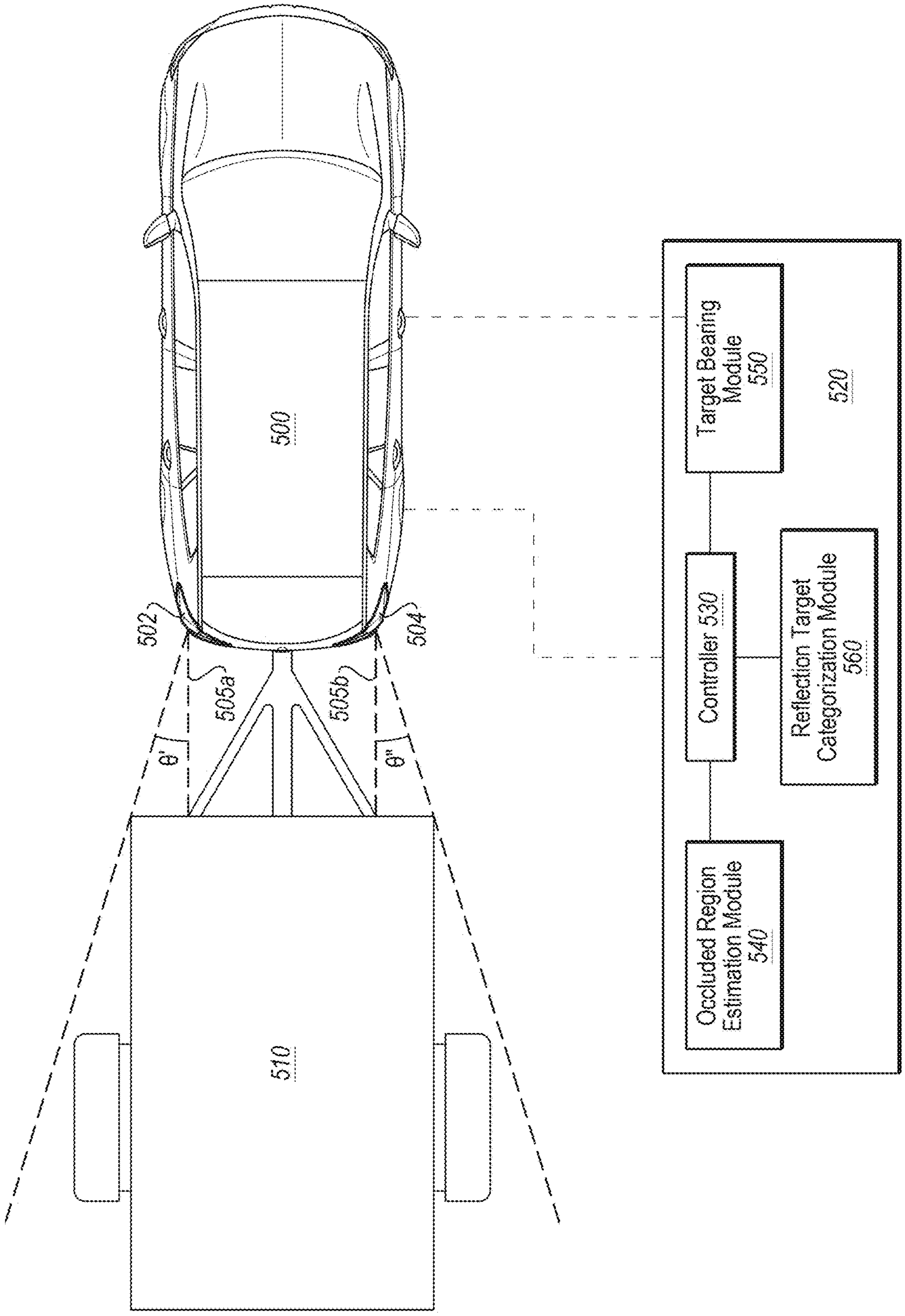
FIG. 5 depicts an example of a system for estimating a trailer-induced occluded region according to some embodiments.

FIG. 5 is a schematic diagram of a system for calculating, estimating, defining, updating, and/or refining a trailer-induced occluded region according to some embodiments. As shown in this figure, host vehicle 500 is towing trailer 510. A pair of sensors 502/504, such as RADAR sensors, are positioned on the rear bumper of vehicle 500. Sensor 502 is configured to detect remote targets and is operably coupled with a detection system 520, which may be configured with one or more functional modules associated with trailer detection, such as an Automatic Trailer Detection (ATD) module, a Trailer Length Detection (TLD) module, a Trailer Clutter Detection (TCD) module, and/or a Blind Spot Detection (BSD) module.

System 520 may be configured to define trailer-induced occluded regions from both sensors 502/504. In the depicted embodiment, an occluded region from sensor 502 is defined by an angle θ' measured from reference line 505*a*. Similarly, an occluded region from sensor 504 at the opposite end of the rear bumper relative to sensor 502 is defined by an angle θ" measured from reference line 505*b*. Reference lines 505*a* and 505*b* are, in the depicted embodiment, configured to extend along and/or parallel to an axis of the host vehicle 500. However, it should be understood that a wide variety of possibilities are contemplated and/or would be apparent to those of ordinary skill in the art after having received the benefit of this disclosure. For example, reference lines may extend from one or both of the sensors 502/504 at any other angle as desired, such as an angle directed at or near a corner of the trailer 510.

System 520 may comprise a combination of various hardware, software, firmware, and the like, as desired. System 520 is operably coupled with sensors 502 and 504, one or both of which may comprise respective sensor modules that may similarly comprise any hardware, software, and/or firmware to support operation of the sensors 502/504 as needed/desired. Those of ordinary skill in the art will appreciate that, although two sensors/sensor modules are shown in the depicted embodiment, the number of sensors and/or corresponding sensor modules may vary as desired without departing from the primary inventive principles disclosed herein, including a single sensor or more than two sensors.

Sensors 502/504 may comprise any number of sensors, such as RADAR sensors, LIDAR sensors, or other sensors configured to send and/or receive electromagnetic radiation. Again, the sensor modules associated with sensors 502/504 may further comprise various other software, hardware, and/or firmware elements as desired in order to send and receive signals for processing by other modules.

System 520 comprises a controller 530, which may be configured to process data from sensors/sensor modules 502/504. As used herein, the term “controller” refers to a hardware device that includes a processor and preferably also includes a memory element. The memory may be configured to store one or more of the modules referred to herein and the controller 530 and/or one or more processors may be configured to execute the modules to perform one or more processes described herein.

Controller 530 may be operably coupled with various functional modules. In addition to those mentioned above, which are not included herein to avoid obscuring the important details of the inventions disclosed herein, controller 530 is operably coupled with an occluded region estimation module 540, a target bearing module 550, and a reflection target categorization module 560.

Occluded region estimation module 540 may be configured to define, calculate, and/or estimate one or more occluded regions within which sensors 502/504 are unable to directly observe external targets due to the presence of trailer 510. As previously mentioned, these regions may be defined by one or more angles, such as angles θ' and θ", which may be defined by respective fixed lines, such as reference lines 505*a*/505*b*.

Thus, in some embodiments, occluded region estimation module 540 may be configured to estimate a trailer-induced occluded region associated with a RADAR or other sensor using data from target bearing module 550. Occluded region estimation module 540 may be configured to define, calculate, and/or estimate these angles θ' and θ" by using data from external targets detected by sensors 502/504 and/or received from other modules, such as target bearing module 550 and/or reflection target categorization module 560. In some embodiments, target bearing module 550 may be configured to detect external targets and detect one or more perceived bearing angles from such targets at one or more points in time. In some cases, if possible, target bearing module 550 may be configured to identify a target by certain characteristics so that it can be tracked over time. Thus, the corresponding bearing angle or perceived bearing angle of the target may change over time during this tracking.

Thus, in some embodiments, target bearing module 550 may be configured to determine detection angles between a reference line and an external target detected by a RADAR sensor or other sensor and determine a direction and/or velocity of travel of the external target and/or an angle associated with the external, such as an angle between a reference line and the external target at one or more points in time.

In some embodiments, the target bearing module 550 and/or other modules of the system may define a tolerance angle for the maximum occlusion angle. In some such embodiments, reflection target categorization module 560 (or another module of the system) may be configured to determine whether a first perceived angle is within the maximum occlusion angle by determining whether the first perceived angle is within the maximum occlusion angle plus the tolerance angle. Similarly, the system may be configured to determine whether one or more subsequent perceived angles are within the maximum occlusion angle by determining whether such perceived angle(s) are within the maximum occlusion angle plus the tolerance angle.

The angles obtained and/or stored by target bearing module 550 may be used by reflection target categorization module 560 to determine, or at least estimate, whether each data point and/or data set is consistent with that of a reflection target or a valid target. That is, a data point or data set associated with a particular target may have characteristics that indicate that it comes from an external target directly, in which case reflection target categorization module 560 may categorize the target as a "valid" target and/or exclude such data from categorization of "reflection target" data.

Similarly, a data point or data set associated with a particular target may have characteristics that indicate that it comes indirectly from an external target—i.e., the characteristics may suggest that the signal from the target has been reflected from a portion of the trailer 510 before being received by the sensor. Such data may be categorized as "reflection target" data and, as discussed below and throughout this disclosure, may be used to define, refine, and/or estimate the scope, such as angle, of the corresponding trailer-induced occluded region associated with such target(s). In other words, if sensor 502 is obtaining data associated with a target that is categorized as a reflection target, occluded region estimation module 540 may use this data to adjust the maximum occlusion angle θ'.

Thus, in some embodiments, reflection target categorization module 560 may be configured to categorize external targets as reflection targets by comparing detection angles, such as angles between a reference line and one or more external targets over time, with a maximum occlusion angle between the vehicle and the trailer and, upon detecting one or more conditions, such as a condition indicating that one or more target detection angles are greater than the maximum occlusion angle, excluding the target associated with the target detection angle from categorization as a reflection target. Data associated with the reflection targets may then be compiled for use by occluded region estimation module 540 to estimate the trailer-induced occluded region of the trailer.

To categorize data from a particular target between valid targets and reflection targets, in some embodiments, reflection target categorization module 560 may be configured to categorize a target as a reflection target upon determining that a perceived angle associated with the target is within a maximum occlusion angle associated with the trailer 510. However, in some cases, additional data may be needed/used to make this determination. Thus, in some embodiments, upon determining that both a first perceived angle and a second perceived angle associated with a target are within the maximum occlusion angle, the target may be categorized as a reflection target. Thus, in some embodiments, upon determining that any perceived angle, such as either a first perceived angle or a second perceived angle or additional perceived angles, are greater than the maximum occlusion angle, reflection target categorization module 560 may be configured to determine that the external target is a valid target.

In some embodiments, reflection target categorization module 560 may only be configured to categorize a target as a reflection target upon making additional determinations. For example, in some embodiments, reflection target categorization module 560 may only be configured to categorize a target as a reflection target upon making a determination that the target appears to have a position and/or track that mimics that of the host vehicle.

In some such embodiments, reflection target categorization module 560 may therefore perform a comparison between the external target track position and the track of the host vehicle and may require a determination that the external track position of the target is not monotonically decreasing relative to the vehicle and/or that the external track position of the target is monotonically non-decreasing before the target can be categorized as a reflection target.

Thus, in some embodiments, only upon determining that the external target track position is not monotonically decreasing relative to the host vehicle (or otherwise determining that the external target appears to be following and/or mimicking the track, position, and/or velocity of the host vehicle), and/or upon determining that one or more perceived angles of the target are within the maximum occlusion angle, will the reflection target categorization module 560 categorize a target as a reflection target. Following such a determination, data from the external target may be transmitted, transferred, and/or used by the occluded region estimation module 540 to estimate (which may encompass defining, calculating, enhancing, refining, and/or updating) the trailer-induced occluded region.

In some embodiments, the reflection target categorization module 560 may be configured to compare perceived travel directions of the external target with corresponding travel directions of the host vehicle and, upon determining that the perceived travel directions match the travel directions of the vehicle at one or more points in time, categorize the external target as a reflection target.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or another electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the inventions disclosed herein. The scope of the present inventions should, therefore, be determined only by the following claims.

The invention claimed is:

1. A method for estimating a trailer-induced occluded region behind a vehicle towing a trailer, the method comprising the steps of:

defining a maximum occlusion angle between the vehicle and the trailer;

detecting an external target using RADAR signals;

determining a first perceived angle associated with the external target at a first time;

determining a second perceived angle associated with the external target at a second time;

determining whether the first perceived angle is within the maximum occlusion angle;

determining whether the second perceived angle is within the maximum occlusion angle; and upon determining that both the first perceived angle and the second perceived angle are within the maximum occlusion angle, using data from the external target to estimate a trailer-induced occluded region of the trailer.

2. The method of claim 1, further comprising, upon determining that either the first perceived angle or the second perceived angle is greater than the maximum occlusion angle, categorizing the external target as a valid target and discarding data from the valid target from an estimate of the trailer-induced occluded region of the trailer.

3. The method of claim 1, further comprising determining whether the external target track position is monotonically decreasing relative to the vehicle.

4. The method of claim 3, wherein, only upon determining that the external target track position is not monotonically decreasing relative to the vehicle, and upon determining that both the first perceived angle and the second perceived angle are within the maximum occlusion angle, using data from the external target to estimate the trailer-induced occluded region of the trailer.

5. The method of claim 1, further comprising:

defining a tolerance angle for the maximum occlusion angle;

wherein the step of determining whether the first perceived angle is within the maximum occlusion angle comprises determining whether the first perceived angle is within the maximum occlusion angle plus the tolerance angle; and wherein the step of determining whether the second perceived angle is within the maximum occlusion angle comprises determining whether the second perceived angle is within the maximum occlusion angle plus the tolerance angle.

6. The method of claim 1, further comprising awaiting receipt of a predetermined number of observations of the external target and, wherein the step of using data from the external target to estimate a trailer-induced occluded region of the trailer is not performed without receipt of the predetermined number of observations of the external target.

7. The method of claim 1, further comprising resetting the estimate of the trailer-induced occluded region of the trailer upon determination of a potential coupling of a new trailer with the vehicle.

8. The method of claim 1, further comprising resetting the estimate of the trailer-induced occluded region of the trailer upon detecting that the vehicle has stopped.

9. A method for distinguishing between reflection targets and valid targets in rear RADAR system for a vehicle towing a trailer, the method comprising the steps of:

detecting an external target using a rear vehicle RADAR system at a first time;

determining an angle between the external target and a reference line extending behind the vehicle;

comparing the angle with a maximum occlusion angle between the vehicle and the trailer; and upon determining that the angle is less than the maximum occlusion angle, categorizing the external target as a reflection target.

10. The method of claim 9, further comprising, upon determining that the angle is greater than the maximum occlusion angle, categorizing the external target as a valid target.

11. The method of claim 9, wherein data from any external targets categorized as a reflection target is used to define an estimated trailer-induced occluded region for the trailer.

12. The method of claim 9, further comprising:

detecting the external target using the rear vehicle RADAR system at a second time;

determining a second angle between the external target and the reference line at the second time;

comparing the second angle with the maximum occlusion angle; and only upon determining that both the angle and the second angle are within the maximum occlusion angle, categorizing the external target as a reflection target.

13. The method of claim 12, further comprising:

detecting a perceived travel direction of the external target at the first time;

detecting a perceived travel direction of the external target at the second time;

comparing the perceived travel directions of the external target at the first and second times with corresponding travel directions of the vehicle at the first and second times; and only upon determining that both the angle and the second angle are within the maximum occlusion angle and determining that the perceived travel directions of the external target at the first and second times match the travel directions of the vehicle at the first and second times, categorizing the external target as a reflection target.

14. The method of claim 9, wherein the maximum occlusion angle is defined by a maximum trailer width supported by the vehicle and a tolerance angle.

15. The method of claim 9, wherein the reference line extends at least substantially parallel to an axis of the vehicle.

16. A system for detecting trailer-induced RADAR occlusion, comprising:

a RADAR sensor positioned on a rear portion of a host vehicle;

a target bearing module configured to:

determine detection angles between a reference line and an external target detected by the RADAR sensor; and determine a direction of travel of the external target;

an occluded region estimation module configured to estimate a trailer-induced occluded region associated with the RADAR sensor using data from the target bearing module; and a reflection target categorization module configured to:

categorize external targets as reflection targets by comparing detection angles between the reference line and the external target over time with a maximum occlusion angle between the vehicle and the trailer and, upon detecting a target detection angle that is greater than the maximum occlusion angle, excluding the target associated with the target detection angle from categorization as a reflection target, and compile data associated with the reflection targets for use by the occluded region estimation module to estimate the trailer-induced occluded region of the trailer.

17. The system of claim 16, wherein the reflection target categorization module is further configured to compare perceived travel directions of the external target with corresponding travel directions of the host vehicle and, upon determining that the perceived travel directions match the travel directions of the vehicle at the first and second times, categorize the external target as a reflection target.

18. The system of claim 16, wherein the rear portion comprises a bumper.

19. The system of claim 16, further comprising a second RADAR sensor positioned on a rear portion of the host vehicle, wherein the target bearing module is further configured to determine target detection angles between a reference line and an external target detected by the second RADAR sensor.

20. The system of claim 19, wherein the occluded region estimation module is further configured to estimate a second trailer-induced occluded region associated with the second RADAR sensor using data from the target bearing module.

* * * * *